US007114052B2

(12) United States Patent
Shoji

(10) Patent No.: US 7,114,052 B2
(45) Date of Patent: Sep. 26, 2006

(54) SEMICONDUCTOR MEMORY DEVICE, A SECTOR-ADDRESS CONVERSION CIRCUIT, AN ADDRESS-CONVERSION METHOD, AND OPERATION METHOD OF THE SEMICONDUCTOR MEMORY DEVICE

(75) Inventor: Haruo Shoji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 10/046,755

(22) Filed: Jan. 17, 2002

(65) Prior Publication Data

US 2002/0099920 A1    Jul. 25, 2002

(30) Foreign Application Priority Data

Jan. 24, 2001  (JP)  ............................. 2001-016302

(51) Int. Cl.
*G06F 12/00*   (2006.01)
(52) U.S. Cl. ............................... 711/202; 713/1; 713/2
(58) Field of Classification Search ................ 711/202; 713/1, 2
See application file for complete search history.

(56) References Cited

U.S. PATENT DOCUMENTS 6,119,226 A *  9/2000  Shiau et al. .................. 713/2
6,401,164 B1 *  6/2002  Bartoli et al. ................ 711/103
6,567,289 B1     5/2003  Cleveland et al. ............. 365/63
6,598,157 B1 *  7/2003  McKee ......................... 711/202
6,643,758 B1 * 11/2003  Furuyama et al. ........... 711/203
2004/0093487 A1 *  5/2004  Fuse et al. ..................... 713/1

FOREIGN PATENT DOCUMENTS

JP           2-236647         9/1990

* cited by examiner

*Primary Examiner*—Mano Padmanabhan
*Assistant Examiner*—Paul Baker
(74) *Attorney, Agent, or Firm*—Arent Fox PLLC

(57) ABSTRACT

The present invention aims at providing a semiconductor memory device that can be operational in a desired boot block mode, regardless of the original boot block type of the device, by facilitating rewriting of the memory device. A sector address from an outside source is inputted into a sector-address conversion circuit, which converts the sector address into an internal address, and a memory cell array is accessed through an address decoder circuit. Suppose that each of banks of the memory device is configured as a bottom boot type. By converting the sector address by the sector-address conversion circuit such that the sector-address now appears to the outside in the reverse order, each of the banks now functions as a top boot type.

11 Claims, 11 Drawing Sheets

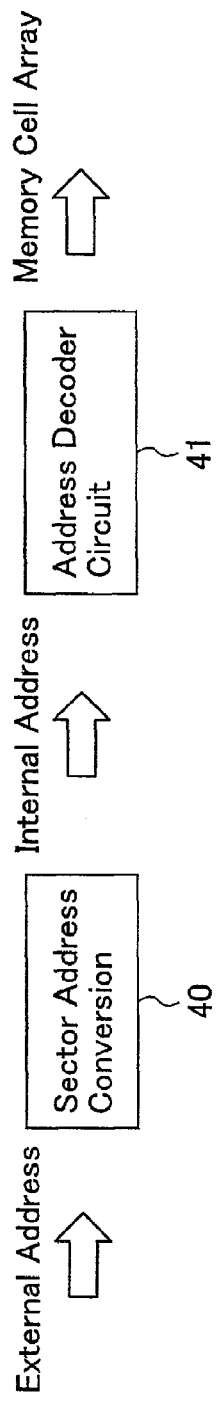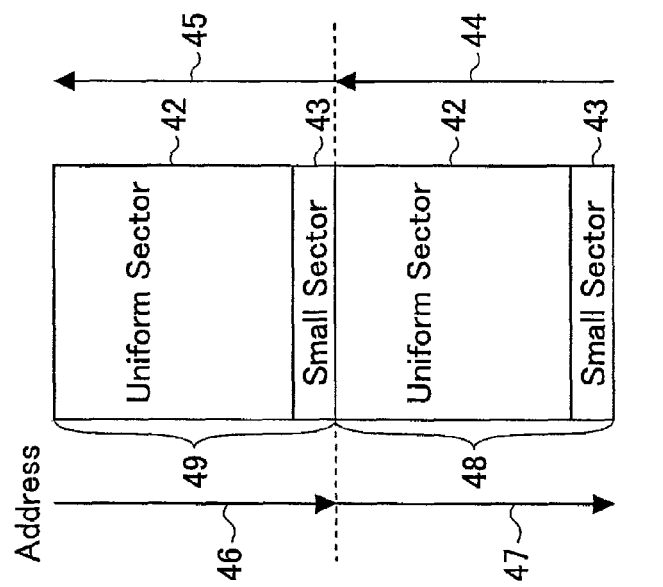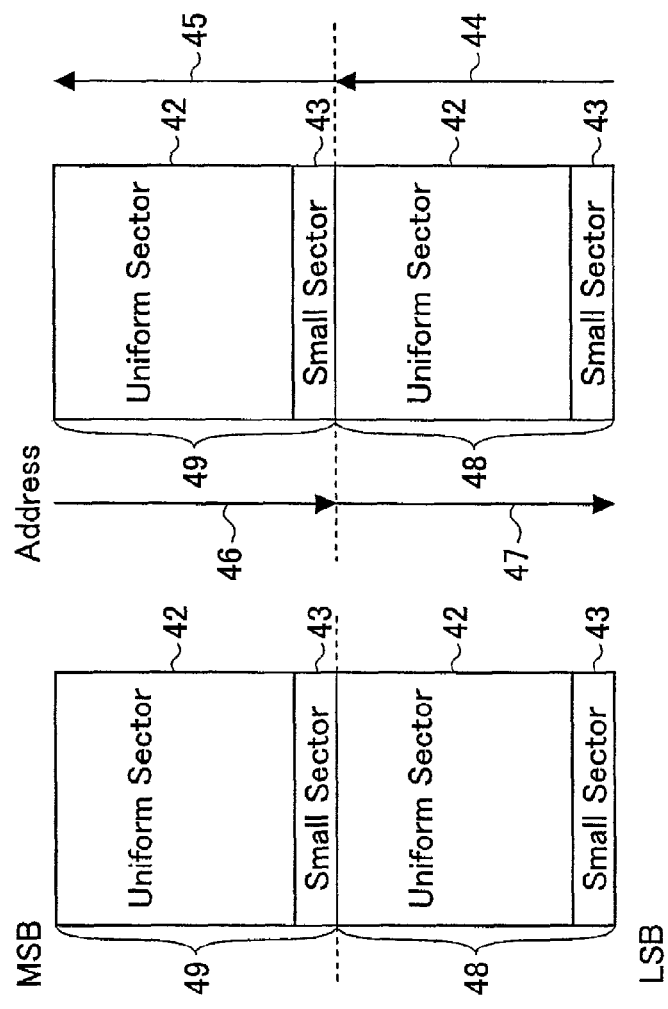

FIG. 7A Example Of Conversion Table For Top Boot Type

| EA19 | IA19 | IA18 | IA17 | IA16 |
|---|---|---|---|---|
| 0 | 0 | EA18# | EA17# | EA16# |
| 1 | 1 | EA18 | EA17 | EA16 |

FIG. 7B Example Of Conversion Table For Bottom Boot Type

| EA19 | IA19 | IA18 | IA17 | IA16 |
|---|---|---|---|---|
| 0 | 0 | EA18 | EA17 | EA16 |
| 1 | 1 | EA18# | EA17# | EA16# |

FIG. 7C

| | EA | | | | Top Boot Type IA | | | | Bottom Boot Type IA | | | |
|---|---|---|---|---|---|---|---|---|---|---|---|---|
| | 19 | 18 | 17 | 16 | 19 | 18 | 17 | 16 | 19 | 18 | 17 | 16 |
| 66 | 0 | 0 | 0 | 0 | 0 | 1 | 1 | 1 | 0 | 0 | 0 | 0 |
| | 0 | 0 | 0 | 1 | 0 | 1 | 1 | 0 | 0 | 0 | 0 | 1 |
| | 0 | 0 | 1 | 0 | 0 | 1 | 0 | 1 | 0 | 0 | 1 | 0 |
| | 0 | 0 | 1 | 1 | 0 | 1 | 0 | 0 | 0 | 0 | 1 | 1 |
| 61 | 0 | 1 | 0 | 0 | 0 | 0 | 1 | 1 | 0 | 1 | 0 | 0 |
| (Corresponds To Bank 53) | 0 | 1 | 0 | 1 | 0 | 0 | 1 | 0 | 0 | 1 | 0 | 1 |
| | 0 | 1 | 1 | 0 | 0 | 0 | 0 | 1 | 0 | 1 | 1 | 0 |
| | 0 | 1 | 1 | 1 | 0 | 0 | 0 | 0 | 0 | 1 | 1 | 1 |
| | 1 | 0 | 0 | 0 | 1 | 0 | 0 | 0 | 1 | 1 | 1 | 1 |
| | 1 | 0 | 0 | 1 | 1 | 0 | 0 | 1 | 1 | 1 | 1 | 0 |
| | 1 | 0 | 1 | 0 | 1 | 0 | 1 | 0 | 1 | 1 | 0 | 1 |
| 62 | 1 | 0 | 1 | 1 | 1 | 0 | 1 | 1 | 1 | 1 | 0 | 0 |
| (Corresponds To Bank 54) | 1 | 1 | 0 | 0 | 1 | 1 | 0 | 0 | 1 | 0 | 1 | 1 |
| | 1 | 1 | 0 | 1 | 1 | 1 | 0 | 1 | 1 | 0 | 1 | 0 |
| | 1 | 1 | 1 | 0 | 1 | 1 | 1 | 0 | 1 | 0 | 0 | 1 |
| 67 | 1 | 1 | 1 | 1 | 1 | 1 | 1 | 1 | 1 | 0 | 0 | 0 |

| Top Input Terminal | Bottom Input Terminal | After Address Conversion |
|---|---|---|
| 0 | 0 | Neither (Conventional Method) |
| 0 | 1 | Selecting Bottom |
| 1 | 0 | Selecting Top |
| 1 | 1 | Input Inhibited |

FIG. 11

| Command Sequence | | Bus Write Cycles Req'd | First Bus Write Cycle | | Second Bus Write Cycle | | Third Bus Write Cycle | | Fourth Bus Read/Write Cycle | | Fifth Bus Write Cycle | | Sixth Bus Write Cycle | |
|---|---|---|---|---|---|---|---|---|---|---|---|---|---|---|
| | | | Addr | Data | Addr | Data | Addr | Data | Addr | Data | Addr | Data | Addr | Data |
| Read/Reset | Word/Byte | 1 | XXXXH | F0H | | | | | | | | | | |
| Read/Reset | Word | 3 | 555H | AAH | 2AAH | 55H | 555H | F0H | RA | RD | | | | |
| | Byte | | AAAH | | 555H | | AAAH | | | | | | | |
| Autoselect | Word | 3 | 555H | AAH | 2AAH | 55H | 555H | 90H | | | | | | |
| | Byte | | AAAH | | 555H | | AAAH | | | | | | | |
| Program | Word | 4 | 555H | AAH | 2AAH | 55H | 555H | A0H | PA | PD | | | | |
| | Byte | | AAAH | | 555H | | AAAH | | | | | | | |
| Chip Erase | Word | 6 | 555H | AAH | 2AAH | 55H | 555H | 80H | 555H | AAH | 2AAH | 55H | 555H | 10H |
| | Byte | | AAAH | | 555H | | AAAH | | AAAH | | 555H | | AAAH | |
| Sector Erase | Word | 6 | 555H | AAH | 2AAH | 55H | 555H | 80H | 555H | AAH | 2AAH | 55H | SA | 30H |
| | Byte | | AAAH | | 555H | | AAAH | | AAAH | | 555H | | | |
| Sector Erase Suspend | Word/Byte | 1 | XXXXH | B0H | | | | | | | | | | |
| Sector Erase Resume | Word/Byte | 1 | XXXXH | 30H | | | | | | | | | | |
| Set to Boot Sector | Word | 3 | 555H | AAH | 2AAH | 55H | 555H | 2FH | | | | | | |
| | Byte | | AAAH | | 555H | | AAAH | | | | | | | |

SEMICONDUCTOR MEMORY DEVICE, A SECTOR-ADDRESS CONVERSION CIRCUIT, AN ADDRESS-CONVERSION METHOD, AND OPERATION METHOD OF THE SEMICONDUCTOR MEMORY DEVICE

BACKGROUND OF THE INVENTION

1. Field of the Invention

This invention relates to a semiconductor memory device, a sector-address conversion circuit, an address-conversion method, and an operation method of the semiconductor memory device.

2. Description of the Related Art

Various kinds of memory devices including a flash memory are known. Generally, the first operation at starting of a system, reset operation and the like is performed by reading a read-only boot program and the like from a memory device.

Conventionally, a boot block used as an object for starting of a system occupies a small sector in a memory device, and is located in the high end or the low end of sector addresses (physical addresses) of the memory device (a bottom boot type or a top boot type, respectively, and called a boot block type) according to a requirement specification of the system. The two types are marketed as distinctly individual products.

FIG. 1A shows the top boot type memory device wherein a small sector 11 located at the highest sector addresses of the memory device serves as the boot block area.

FIG. 1B shows the bottom boot type memory device wherein a small sector 16 located at the lowest sector addresses of the memory device serves as the boot block area.

For an STB (set top box), there is a need to write new data while keeping data in a memory currently used in the system. That is, when there is an option service newly added and the like, it is necessary to write data or a program transmitted from a circuit to the memory device, while watching television through a television circuit.

The STB has two memory devices 20 and 25 as shown in FIG. 2. The memory device 20 is rewritten using a program stored in a boot block area 26, keeping data in the memory device 25. Further, the memory device 25 is similarly rewritten using a program stored in a boot block area 21, keeping data of the memory device 20. Thus, two memory devices are used to rewrite contents of the other memory device alternately.

Moreover, as shown in FIG. 3, a memory device that has small sectors 31 and 32 in the sectors of the highest addresses and the lowest addresses, respectively, is also available.

In addition, the boot program is stored in the lowest physical addresses of a memory device when the small sector is located in the lowest addresses of the memory device. Moreover, the boot program is stored in the highest physical addresses of a memory device when the small sector is located in the highest addresses of the memory device.

However, rewriting of the data within the same system and the like always requires to use the same boot block type from design restrictions, and rewriting between memory devices with different boot block types has a problem that it cannot be easily performed.

Moreover, a type of a memory device that has two or more banks, each having a small sector that can be used as a boot block, and rewriting each other is also marketed.

However, a problem with this type is that address areas of the boot block differ (e.g. a bank or some banks are the top boot block type and the other banks are the bottom boot block type), causing difficulties in rewriting the memory device.

SUMMARY OF THE INVENTION

It is a general object of the present invention to provide a device, a circuit, a method, and an operation method that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the device, the circuit, the method, and the operation method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a semiconductor memory device that can be operated as a desired boot block type irrespective of the original boot block type of the memory device, and a circuit, a method and an operation method therefor.

In order to provide the above-mentioned subject, the present invention adopts means as described hereunder.

The present invention enables easy rewriting of a memory while maintaining contents of another memory by splitting a semiconductor memory device (for example, a flash memory) into a plurality of areas (for example, banks) wherein the plurality of the areas accommodate a plurality of small sectors in the highest or the lowest physical address in each area or in a series of a plurality of the physical addresses containing the highest or the lowest physical address in the area, respectively.

The present invention further enables conversion of a boot block type of a semiconductor memory device that has a plurality of areas wherein a plurality of the small sectors are provided in addition to a plurality of sectors larger than the small sectors. A desired block type can be assigned to each of the areas, regardless of the original boot block type of the memory device. In order to provide the conversion, the present invention provides an address-conversion circuit that converts a sector address inputted from the outside to an internal address so that all the plurality of the areas have the same boot block type.

The conversion circuit is structured such that a bottom signal or a top signal is supplied to control the boot block type.

The conversion circuit can also be structured such that a boot block type specifying command is given to a control circuit.

In these manners, a sector address can be converted for a desired boot block type easily.

The present invention provides a semiconductor memory device that can be used at the time of starting a system (at a power up, a rebooting, a resetting and the like) and rewriting by storing a rewriting program or a boot program in the small sector in the semiconductor memory device at any time.

The address conversion circuit is applicable to a semiconductor memory device having a plurality of sectors, each of which further has a plurality of sectors. Thereby, the sector address inputted from the outside is converted by the address conversion circuit such that the plurality of the areas operate as the same boot block type.

The present invention also provides a sector-address conversion circuit that includes sector-address input terminals, sector-address output terminals, boot block type specifying terminals to specify the boot block type of a memory device and sector-address conversion circuits with a signal conversion circuit. The above-mentioned signal conversion circuit converts a sector address impressed to the sector-address input terminals, based on the most significant bit (for example, A19) and a signal impressed to the above-mentioned boot block type specifying terminals. The above-mentioned sector-address conversion circuit makes the memory device including the above-mentioned sectors to operate as a desired boot block type by outputting the sector-address converted by the above-mentioned signal conversion circuit from the sector-address output terminals.

The above-mentioned sector-address conversion circuit can be a control circuit of the semiconductor memory device, which may be structured such that a boot block type specifying command can be inputted.

The present invention provides a method to use the semiconductor memory device having two areas. That is, a rewriting program is loaded to a small sector of one of the two areas, called the first area that rewrites a uniform sector of the other area, called the second area, then the rewriting program is loaded to the small sector of the second area to rewrite the uniform sector of the first area.

BRIEF DESCRIPTION OF THE DRAWINGS

FIGS. 4A, 4B and 4C are drawings showing the principle of first sector-address conversion;

FIGS. 7A, 7B and 7C are drawings showing an example of a sector-address translation table;

FIG. 11 is a drawing showing a command and address conversion of a flash memory.

DESCRIPTION OF THE PREFERRED EMBODIMENTS

Figure 1A:
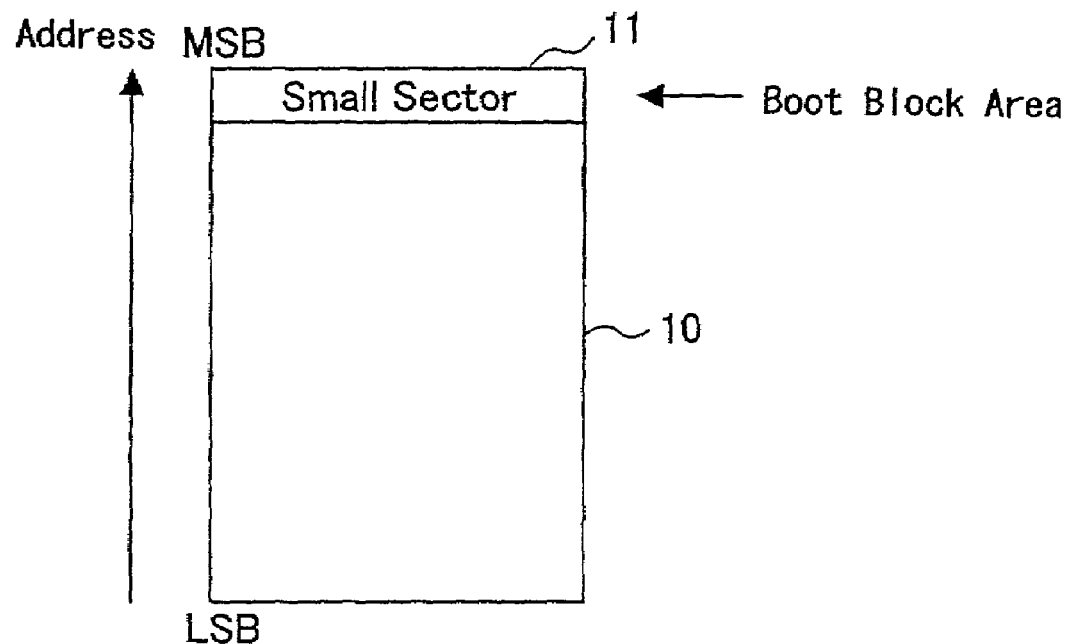
FIGS. 1A and 1B are illustrative drawings showing a conventional memory device of a top boot type and a bottom boot type, respectively.
Figure 1B:
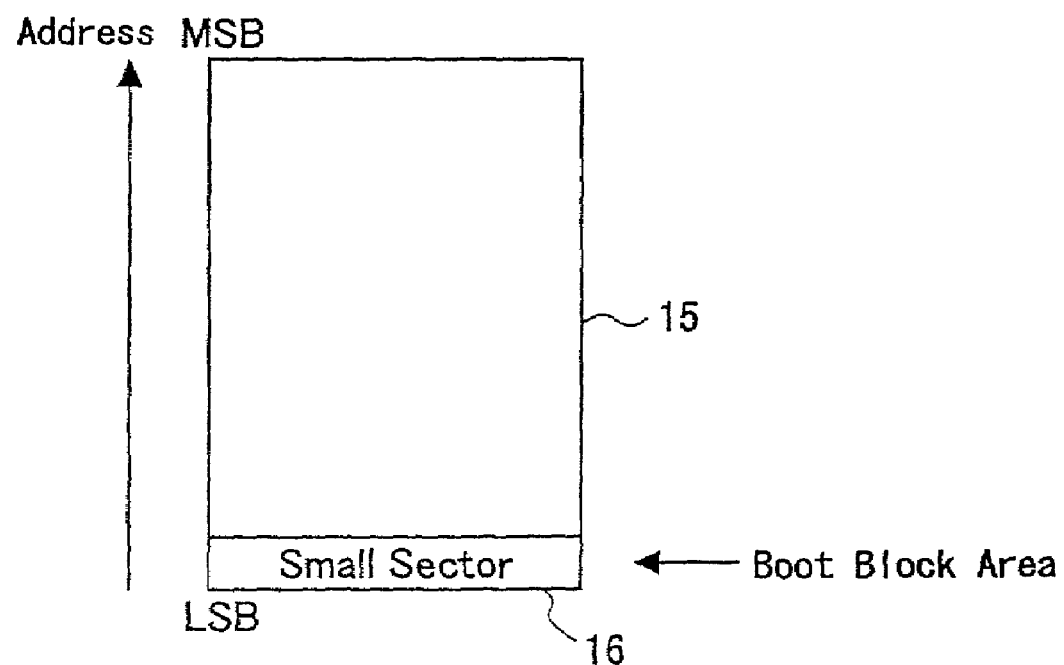
Figure 2:
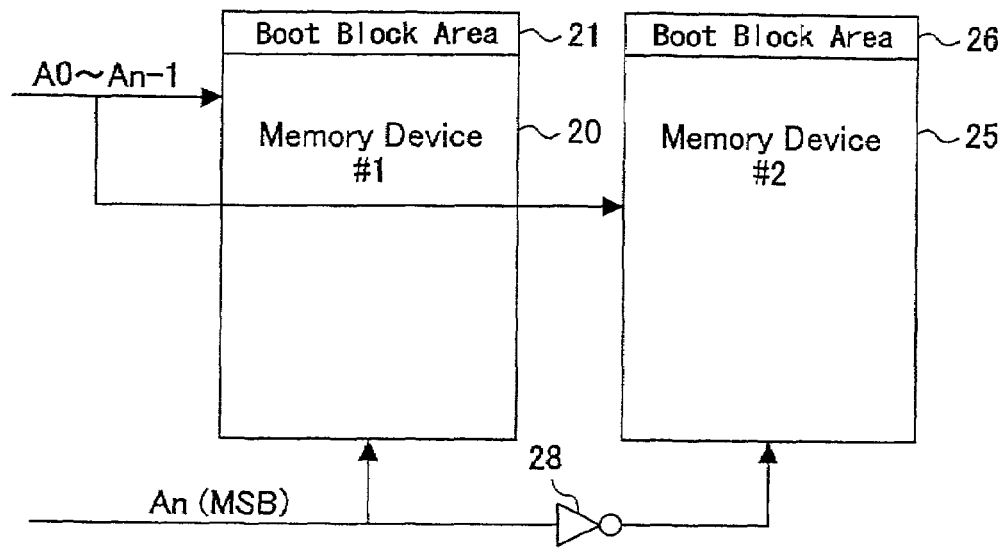
FIG. 2 is a drawing showing rewriting of a memory device in an STB.

In the following, an embodiment of the present invention will be described with reference to the accompanying drawings.

First, the principle of the sector address conversion of the memory device of this invention will be described with reference to FIGS. 4A, 4B and 4C and FIG. 5.

As shown in FIG. 4A, a sector address from the outside is inputted into a sector-address conversion circuit 40. By the sector-address conversion circuit 40, the address is converted into a sector address of the internal address, and a memory cell array (memory device) is accessed through an address decoder circuit 41.

The memory device can be accessed from the outside as a top boot type or a bottom boot type memory device as required by the sector-address conversion circuit 40, regardless of whether the memory device is (originally) a top boot type or a bottom boot type.

The memory device shown in FIG. 4B has two banks 48 and 49, each of which includes a uniform sector 42 and a small sector 43. Since the lower part of the drawing represents LSB (Least Significant Bit) and the upper part represents MSB (Most Significant Bit), each bank is structured as a bottom boot type.

Then, if the sector of the memory device is accessed in the order of physical addresses as shown by arrows 44 and 45, without using an address decoder circuit 41 (or without changing the address if the address decoder circuit 41 is used), the two banks 48 and 49 function as bottom boot type banks.

However, if the sector-address conversion circuit 40 changes the sector address such that it appears to the outside that the address is set up in the order as shown by arrows 46 and 47, the two banks 48 and 49 function as top boot type banks.

Thus, the present invention enables a memory device with a plurality of small sectors to function as a plurality of devices with a top boot type or bottom boot type by preparing the address-conversion circuit that defines a boot block area in one of the upper or the lower areas of the sector address of the memory device.

Figure 5A:
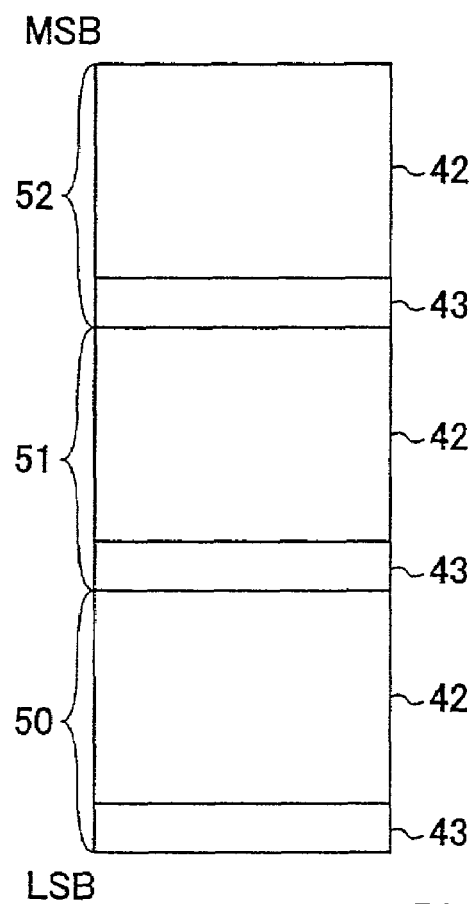
FIGS. 5A, 5B and 5C are drawings showing the principle of second sector-address conversion.
Figure 5C:
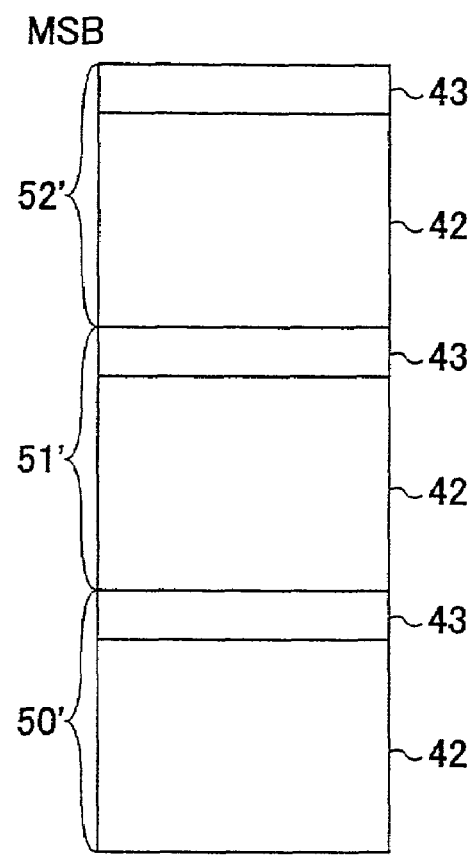

FIG. 5A describes a memory device with three units of the bottom boot type bank that is shown in FIG. 4B, and FIG. 5C describes a memory device with three top boot type banks. Here, although the embodiment is described around a memory device with two or three banks, the number of banks in the present invention is not limited to two or three, but the invention can apply to a memory device with any plurality of banks.

Figure 3:
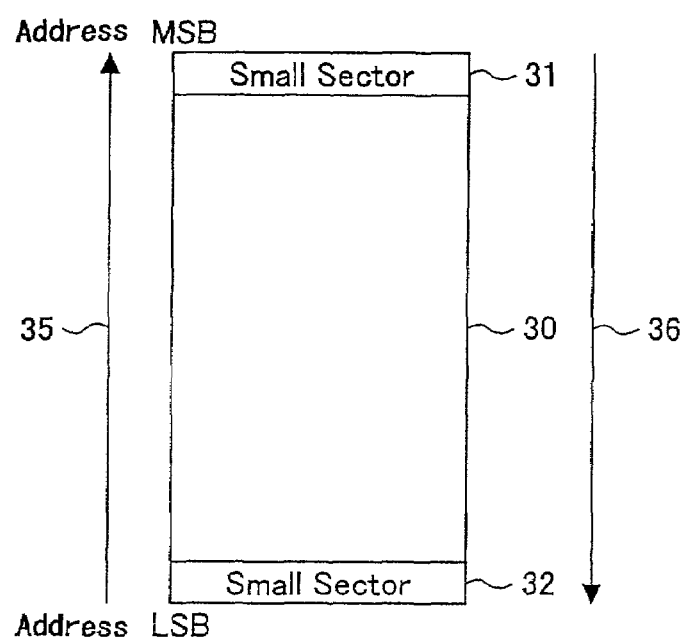
FIG. 3 is a drawing showing a memory device that has two small sectors, one at the least significant sector address, and the other at the most significant sector address.
Figure 5B:
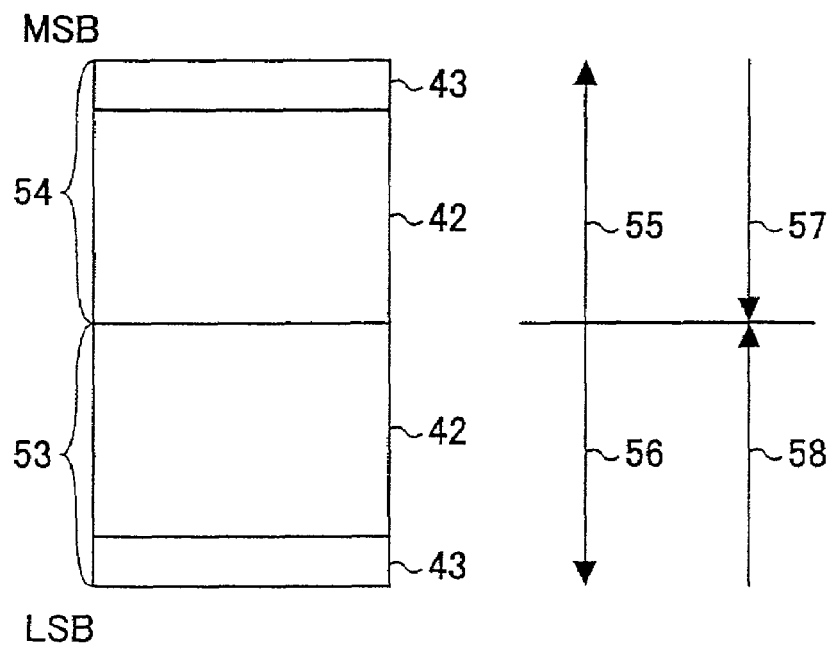

FIG. 5B shows a case where the memory device of FIG. 3 is divided into two banks. If viewed from a physical address, a bank 53 is a bottom boot type and a bank 54 is a top boot type. In contrast thereto, if the address is made to appear to the outside in the order as shown by arrows 55 and 56 by using the sector-address conversion circuit 40, the banks 53 and 54 function as the top boot type. If the address is made to appear in the order as shown by arrows 57 and 58, the banks 53 and 54 function as the bottom boot type.

Conversion of the sector address in the case of FIG. 5B will be described with reference to FIGS. 6A and 6B.

Figure 6A:
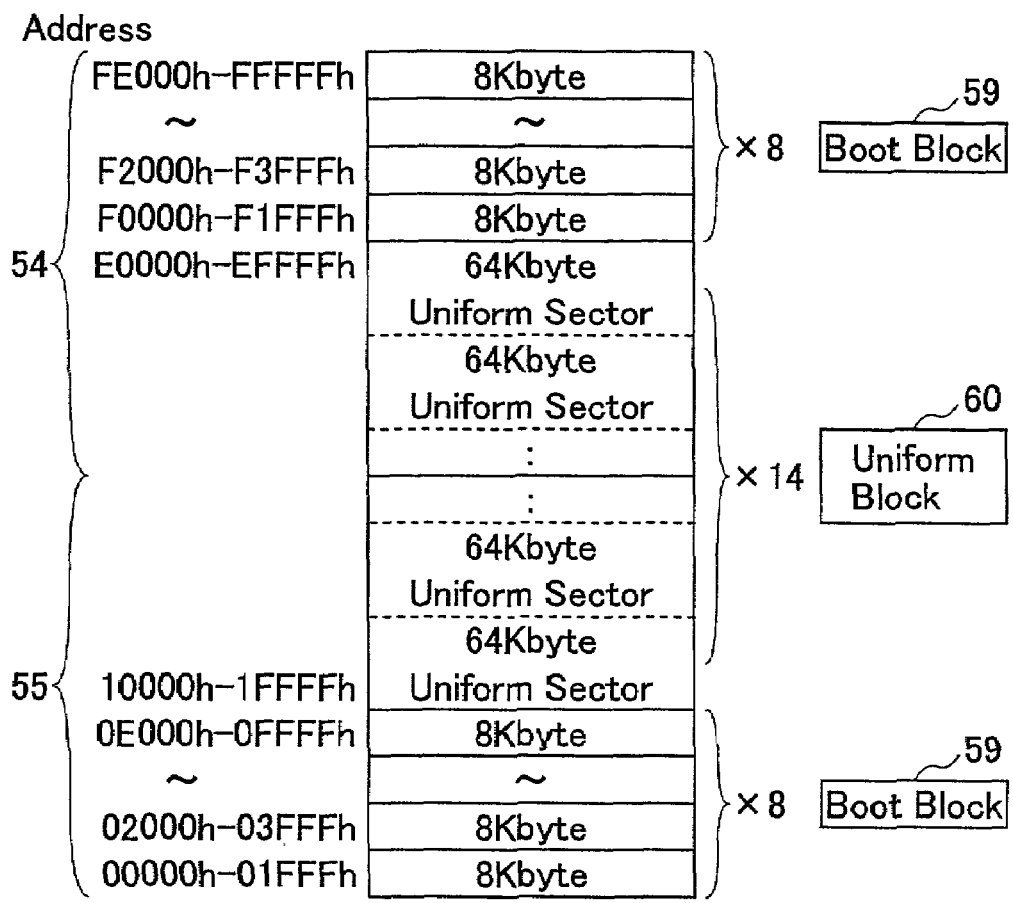
FIGS. 6A and 6B are drawings showing an example of sector-address conversion.

The memory device shown in FIG. 6A has a memory space of 8 Mb, for example. The device has two boot blocks 59, each occupying 64 Kb (=8 Kb×8) and defined as constituting a sector. The device also has 14 uniform sectors 60, each occupying a capacity of 64 Kb.

Therefore, the memory device in the drawing has a total of 16 sectors, each having a 64 Kb capacity. Here, the address given in FIG. 6A represents a physical address. Since there are 16 sectors, a sector address can be expressed by 4 bits.

The present embodiment expresses a sector address by 4 bits of 16$^{th}$ through 19$^{th}$ bits of the address (here, referred to as A16 through A19 for convenience). Moreover, as to the external address, an E is prefixed to be referred to as EA16 through EA19, and an I is prefixed instead to the internal address to be referred to as IA16 through IA19.

Figure 6B:
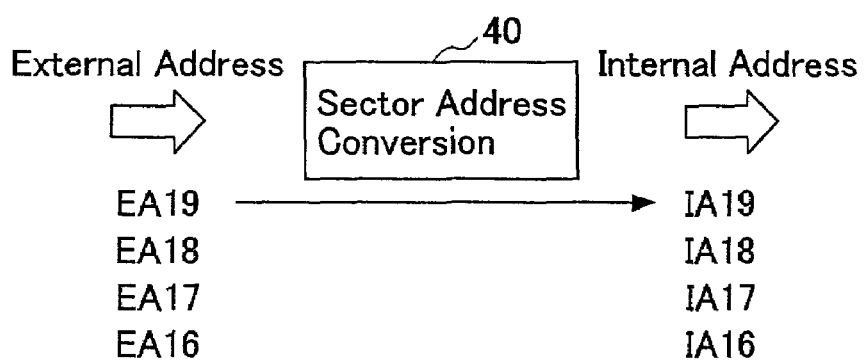
Figures 8A, 8B:
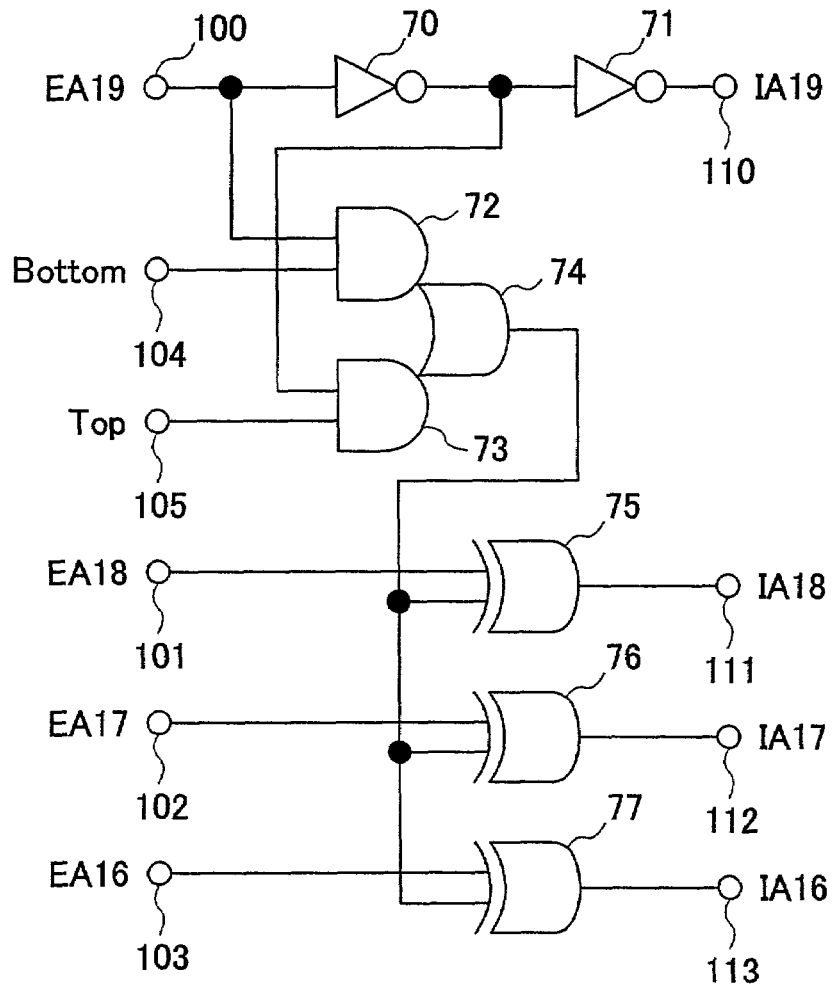
FIGS. 8A and 8B are first drawings showing an example of a sector-address conversion circuit.
Figure 9:
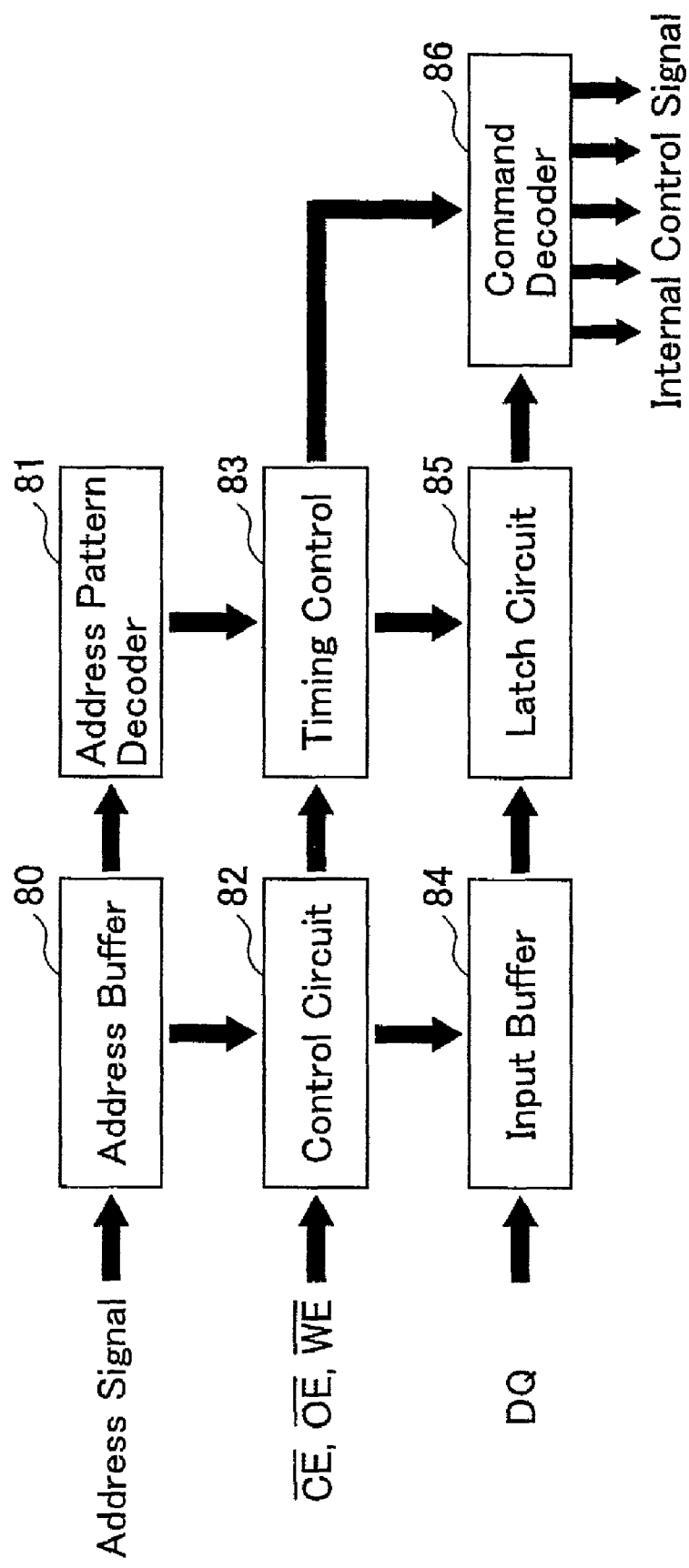
FIG. 9 is a second drawing showing an example of the sector-address conversion circuit.

According to this notation, the sector-address conversion circuit 40 is a circuit that converts the external addresses EA16 through EA19 into the internal addresses IA16 through IA19, as shown in FIG. 6B. The conversion may be performed with reference to a table as shown in FIGS. 7A, 7B and 7C or by circuits as shown in FIGS. 8A and 8B and FIG. 9.

FIGS. 7A, 7B and 7C show translation tables for the address conversion using a conversion table. FIG. 7C is the translation table, and FIG. 7A and FIG. 7B are a summary thereof for the top boot type and the bottom boot type, respectively. Here, a sign "#" used in FIG. 7A and FIG. 7B indicates an inverse. For example, "#EA19" represents an inverse of "EA19", that is, if "EA19" is "1", "#EA19" is "0".

If a sector address is set up like 55 and 56 in FIG. 5B, the banks 53 and 54 will function as the top boot type, and if the sector address is set up like 57 and 58, the banks 53 and 54 will function as the bottom boot type.

In addition, in the present embodiment, the external sector address bits EA16, EA17, EA18, and EA19 express 16 addresses from 0000 (reference number 66) to 1111 (reference number 67). All addresses 61 belong to the bank 53, and their EA19 that is the most significant bit of the address are "0". All addresses 62 belong to the bank 54, and their EA19 are "1". Therefore, the address bit EA19 identifies a corresponding bank.

That is, when the EA19 is "0", an address belongs to the bank 53, and when the EA19 is "1", the address belongs to the bank 54.

As mentioned above, the bank 53 is of the bottom boot type. If the bottom boot type is desired, the internal address shall be the same as the external address. However, if the top boot type is desired for operation of the bank 53, the sector address is set up like 56 in FIG. 5B. The set up is realized by making the internal address bits IA16, IA17, and IA18 (63) to take an inverse value of the address bits of EA16, EA17, and EA18, respectively.

Similarly, since the bank 54 is the top boot type, the same setup as the external address shall be applied if the top boot type is desired. However, in order to operate the bank 54 as the bottom boot type, the sector address is set up like 57 in FIG. 5B. To realize this, the internal address bits IA16, IA17, and IA18 (64) should be converted to an inverse value of the address bits of EA16, EA17, and EA18, respectively.

The above describes how the tables of FIG. 7A, FIG. 7B and FIG. 7C are prepared and used.

FIG. 8A is an embodiment example of the conversion circuit shown in FIGS. 6A and 6B.

The conversion circuit includes a sector-address input terminal, a sector-address output terminal, a boot block type specifying terminal that specifies the boot block type of the memory device, and a signal conversion circuit. The conversion circuit converts a sector address impressed to the sector-address input terminal, based on the most significant bit of the sector address and a signal impressed to the boot block type specifying terminal such that the memory device that contains the sector operates as a desired boot block type.

The circuit of FIG. 8A includes NOT circuits 70 and 71, AND circuits 72 and 73, an OR circuit 74, XOR circuits 75, 76, and 77, sector-address input terminals 100–103, sector-address output terminals 110–113, and boot block type specifying terminals 104 and 105 (a top boot type specifying signal input terminal and a bottom boot type specifying signal input terminal, respectively) that determine the boot block type of the memory device.

This circuit converts the external address bits EA16, EA17, EA18, and EA19 to the internal address bits IA16, IA17, IA18, and IA19, respectively, as described above in reference with the tables in FIGS. 7A, 7B and 7C.

As shown in FIG. 8B, the bottom signal is put to "H" when the bottom boot type is desired, and the top signal is put to "H" when the top boot type is desired. It is inhibited that both the bottom signal and the top signal are put to "H" simultaneously.

In the above, operation of the sector-address conversion circuit in FIG. 8A has been described, where the bottom signal and the top signal are inputted from an external terminal.

FIG. 9 shows another example of the sector-address conversion circuit. In this example, sector addresses are converted by inputting a specific command into a control circuit of the memory device.

The conversion circuit described in FIG. 9 includes an address buffer 80 to store an address signal temporarily, an address pattern decoder 81 to decode a pattern of the address and obtain a timing signal, a control circuit 82 to control according to an inputted control signal, a command, and the like, a timing control circuit 83 to adjust timing of a latch circuit, a command decoder, and the like by acquiring timing from the output of the address pattern decoder, an input buffer 84 to store an incoming signal temporarily, a latch circuit 85 to latch input data, and a command decoder 86 to decode a command.

The command decoder 86 outputs a sector-address conversion signal, based on the address signal, CE (Chip Enable), OE (Output Enable), WE (Write Enable), and data (DQ).

Figure 10:
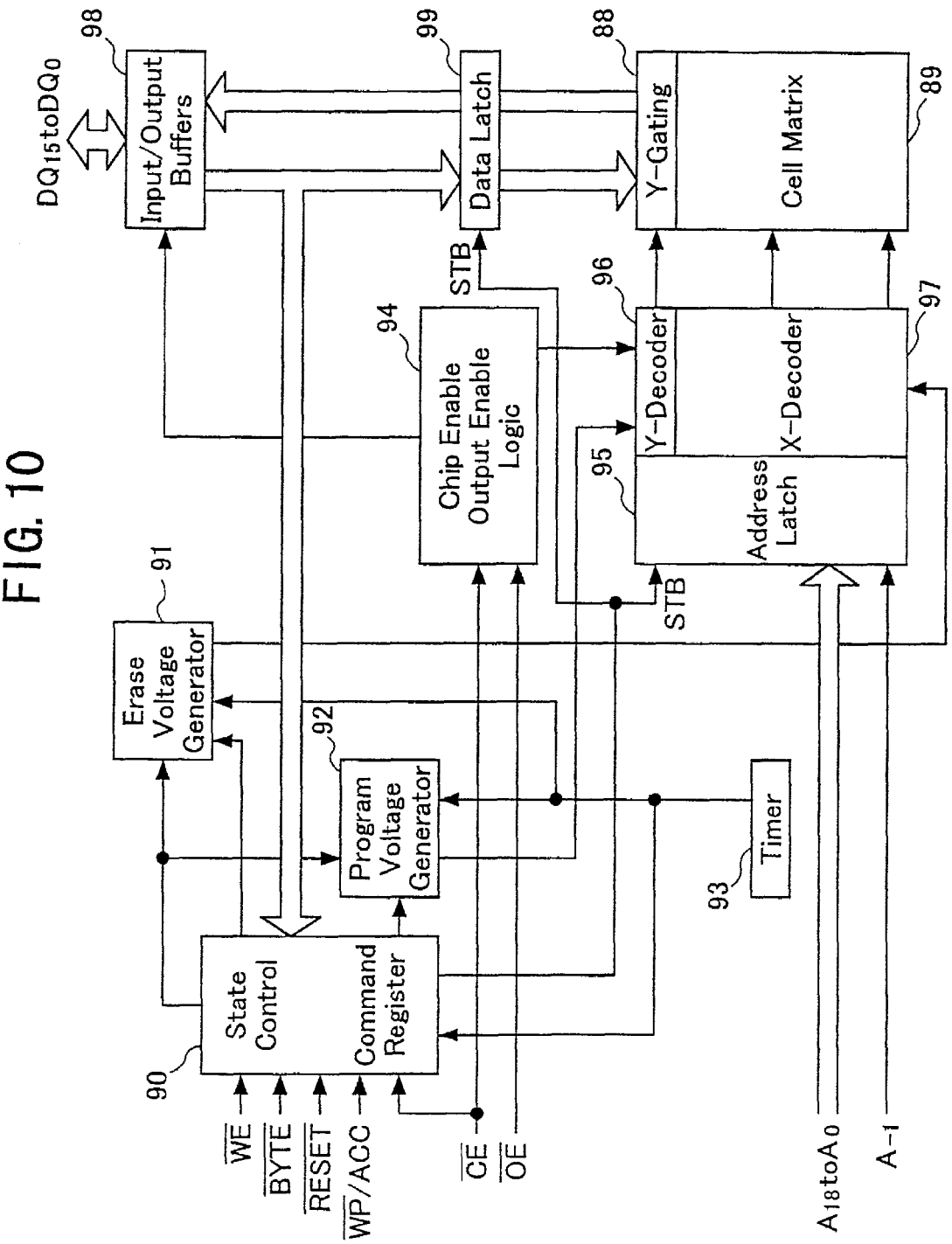
FIG. 10 is a drawing showing a flash memory device and its control circuit.

FIG. 10 shows an example of a flash memory and its control circuit, which include a column gating (Y-gating) circuit 88 to open and close an input and an output of a column signal according to an output of a column address decoder (Y-decoder) 96, a cell matrix 89 which is a flash memory, a state control and command register 90 to temporarily store a command and to control according to an input signal, a command and the like, an erase voltage generator 91 to generate the erase voltage for the flash memory, a writing voltage generator 92 to generate the writing voltage for the flash memory, a timer 93, a CE-OE logic circuit 94 to generate a control signal according to the CE signal and the OE signal received, an address latch 95 to latch the inputted address signal, the column address decoder (Y-decoder) 96 to decode a column address, a line address decoder 97 to decode a line address, an input/output buffer 98 to temporarily store input/output data, and a data latch circuit 99 to temporarily latch the data.

In this configuration, the sector addresses are switched for a top boot type or a bottom boot type operation, by inputting data "AAH" to an address "AAAH" in the first bus cycle, inputting data "55H" to an address "555H" in the second bus cycle, and inputting data "2FH" to the address "AAAH" in the 3rd bus cycle in the case of a byte mode, as shown in a command list of FIG. 11.

Figure 12:
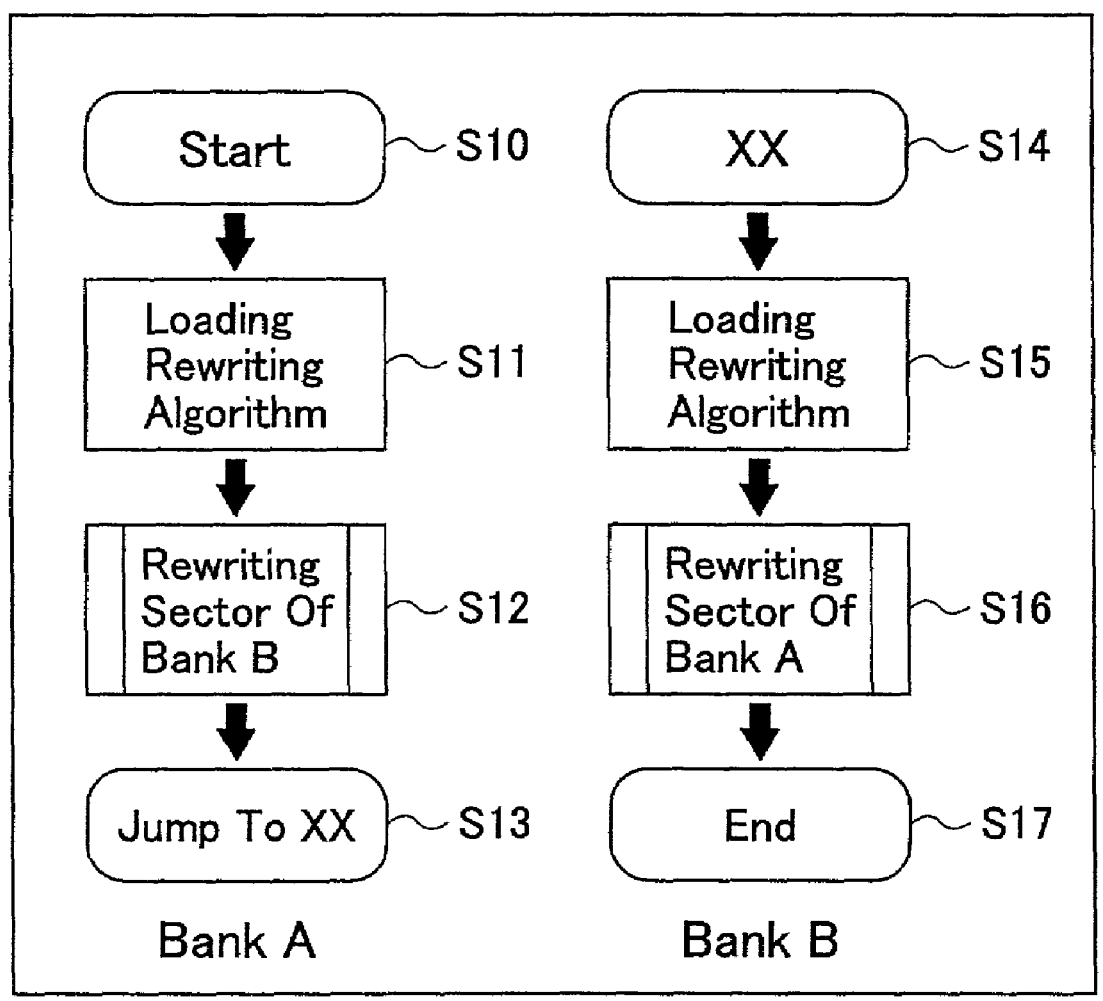
FIG. 12 is a drawing showing an example of an operation method of a semiconductor memory device.

Next, a description will follow concerning a usage of the semiconductor memory device (also applicable to a semiconductor memory device functioning as two banks of the same boot block type using an address-conversion circuit) which has two banks (bank A and bank B) with the same boot block type, having a small sector at the most significant or the least significant physical address of each bank in reference with FIG. 12.

First, a rewriting program is loaded to the small sector of the bank A (S11), then, the uniform sector of the bank B is rewritten using this program (S12).

Subsequently, the process jumps to the bank B (S13) to load the rewiring program to the small sector of the bank B (S15), and the uniform sector of the bank A is rewritten using this program (S16).

In this manner, new data can be rewritten easily while data is maintained in the memory currently used within a system.

According to the present invention, rewriting of a memory device is facilitated, and a memory device that operates as a desired boot block type irrespective of the original boot block type of the device becomes available.

Further, when a plurality of small sectors are present in a memory device, a plurality of memory units with the top boot block or the bottom boot block become available, by providing an address-conversion circuit that defines an area of the boot block in the highest or in the lowest area of the sector address of the memory device. A system that conventionally had to use two or more memory devices can now be built by one memory device.

Further, a system such as an STB and the like has conventionally been installed with two or more memory devices so that new data can be written to a memory, while maintaining data to a memory currently used, by storing the rewriting program in each boot block to rewrite data of the other memory alternately. Now, one memory device can provide the equivalent memory configuration.

Further, the present invention is not limited to these embodiments, but various variations and modifications may be made without departing from the scope of the present invention.

The present application is based on Japanese priority application No. 2001-016302 filed on Jan. 24, 2001, with the Japanese Patent Office, the entire contents of which are hereby incorporated by reference.

What is claimed is:

1. A semiconductor memory device, comprising:
a plurality of areas, each accommodating one or more small sectors in a predetermined physical address of each area, or in a series of a plurality of physical addresses including the predetermined physical address of the area, said predetermined physical address being one of a highest physical address of the area and a lowest physical address of the area;
a plurality of sectors larger than one or more of the small sectors in each of the plurality of the areas; and
an address-conversion circuit configured to perform conversion of a sector address inputted from an outside source to make the plurality of the areas function as the same boot block type,
wherein the address-conversion circuit controls conversion of the sector address based on a signal specifying a boot block type, inputted from the outside source.

2. The semiconductor memory device as claimed in claim 1, wherein the address-conversion circuit is a control circuit for controlling the semiconductor memory device, which controls conversion of the sector address based on an inputted command specifying a boot block type.

3. The semiconductor memory device as claimed in claim 1, which is capable of storing one of a rewriting program or a boot program into one or more of the small sectors at any time.

4. A sector-address conversion circuit comprising:
a sector-address input terminal;
a sector-address output terminal;
a boot block type specifying terminal that specifies a desired boot block type of a memory device having a plurality of sectors; and
a signal conversion circuit that converts a sector address inputted to the sector-address input terminal based on a signal inputted to the boot block type specifying terminal and a most significant bit of the sector address, and outputs a converted sector address from the sector-address output terminal, so that the semiconductor memory device functions as a desired boot block type, wherein the sector address inputted may address any one of the plurality of sectors in the memory device.

5. The sector-address conversion circuit as claimed in claim 4, comprising a control circuit for controlling the semiconductor memory device, which specifies a boot block type by providing a command.

6. An operation method of operating the semiconductor memory device claimed in claim 1, said semiconductor memory device being split into two areas, each having one or more small sectors, comprising:
loading a rewriting program to one or more of the small sectors of a first area;
rewriting a uniform sector of a second area using said rewriting program stored in the first area;
loading a rewriting program to one or more of the small sectors of the second area; and
rewriting a uniform sector of the first area using said rewriting program stored in the second area.

7. A method for converting an address, comprising:
connecting a conversion circuit to a semiconductor memory device having a plurality of areas, each having a plurality of sectors larger than one or more of small sectors in each of the plurality of the areas; and
converting a sector-address inputted from an outside source based on a signal specifying a boot block type by the sector-address conversion circuit, so that the semiconductor memory device functions as a same boot block type, wherein the sector address inputted may address any one of the plurality of sectors in the memory device.

8. The method of claim 7, wherein each of the plurality of sectors can be changed to be a top or bottom boot block type.

9. The method of claim 7, wherein:
the sector-address conversion circuit changes the memory address to one of a top or bottom type.

10. The circuit of claim 4, wherein each of the plurality of sectors can be changed to be a top or bottom boot block type.

11. A sector-address conversion circuit, comprising:
a sector-address input terminal;
a sector-address output terminal;
two boot block type specifying terminals receiving internal signals to change a sector of a memory device to be a top or bottom boot block type; and
a signal conversion circuit that converts a sector address inputted to the sector-address input terminal based on a signal inputted to one of the boot block type specifying terminals and a most significant bit of the sector address, and outputs a converted sector address from the sector-address output terminal, so that the semiconductor memory device functions as a desired boot block type, wherein the sector address inputted may address any one of the plurality of sectors in the memory device.

* * * * *